Nov. 19, 1946.  W. M. HENDERSON  2,411,210
TRENCH EXCAVATOR
Filed Feb. 27, 1945  5 Sheets-Sheet 3

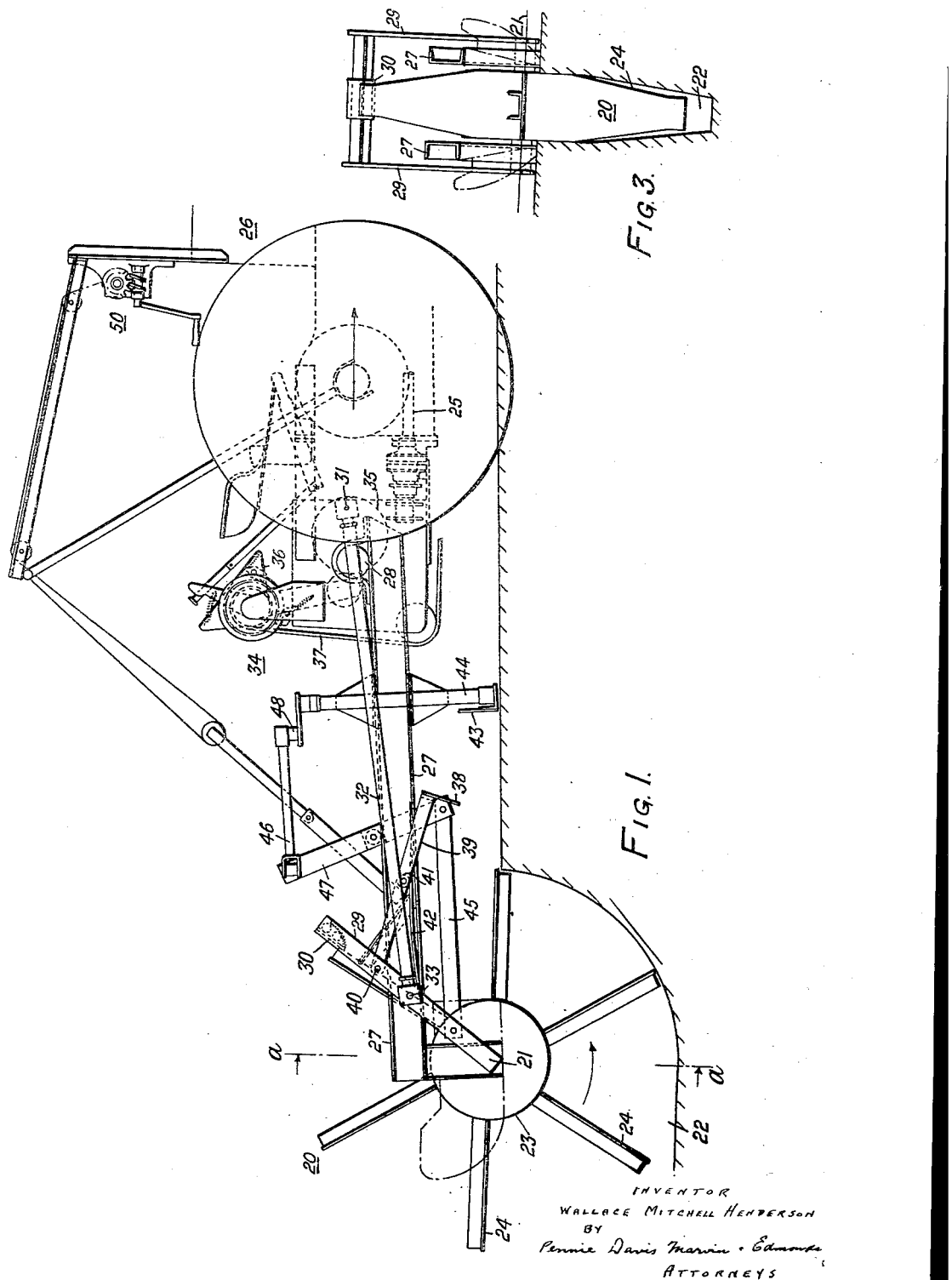

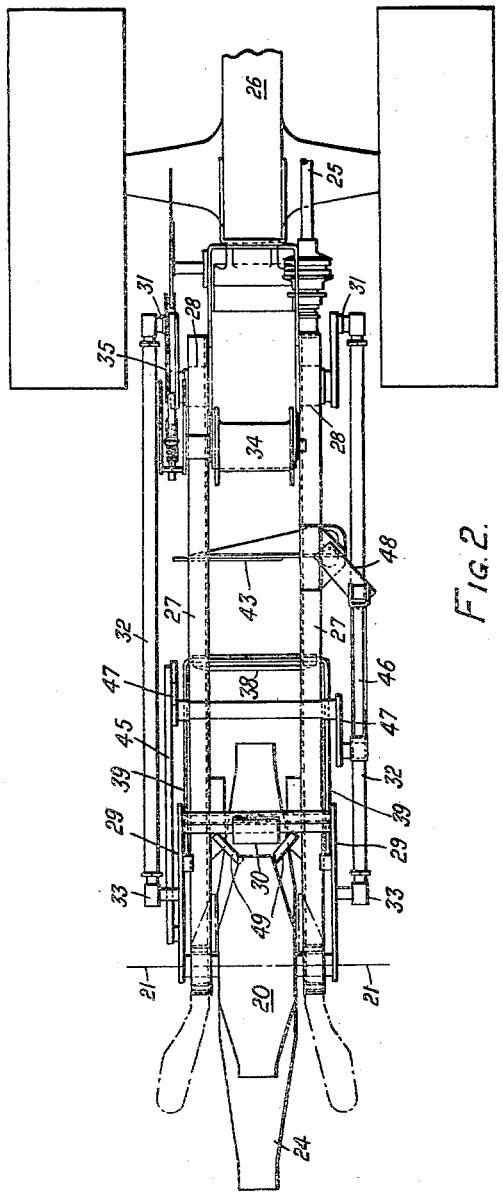

INVENTOR
WALLACE MITCHELL HENDERSON
BY
Pennie Davis Marvin & Edmonds
ATTORNEYS

Nov. 19, 1946. W. M. HENDERSON 2,411,210
TRENCH EXCAVATOR
Filed Feb. 27, 1945  5 Sheets-Sheet 5

INVENTOR
WALLACE MITCHELL HENDERSON
BY
Pennie Davis Marvin & Edmonds
ATTORNEYS

Patented Nov. 19, 1946

2,411,210

UNITED STATES PATENT OFFICE 2,411,210

TRENCH EXCAVATOR

Wallace Mitchell Henderson, Stepps, Scotland, assignor to Aveling-Barford Limited, Grantham, England, a corporation of Great Britain Application February 27, 1945, Serial No. 579,916
In Great Britain July 1, 1943

3 Claims. (Cl. 37—95)

The subject of this invention is an excavator for use in forming agricultural and other trenches in the ground.

A trench-forming excavator according to the invention includes an excavating rotor implement adapted to be rotated stepwise, primary scraper means for displacing excavated material from the implement to a position in advance of the implement, and secondary scraper means for displacing the material deposited in advance of the implement to a position on the ground alongside the excavator, said primary and secondary scraper means performing a cycle of operation for each rotative step of the rotor implement.

Figure 4:
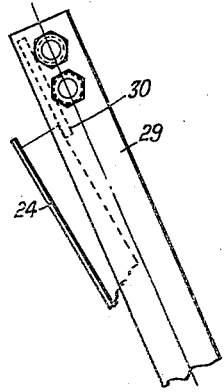
Figure 5:
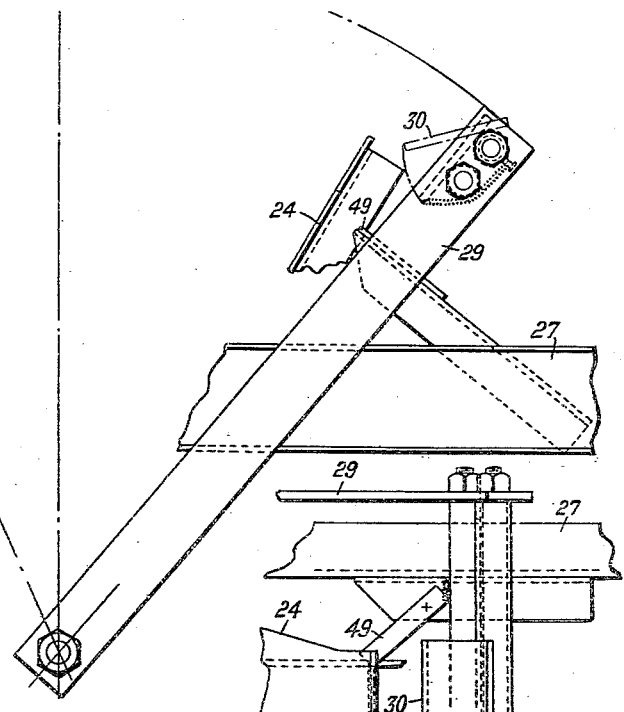
Figure 6:
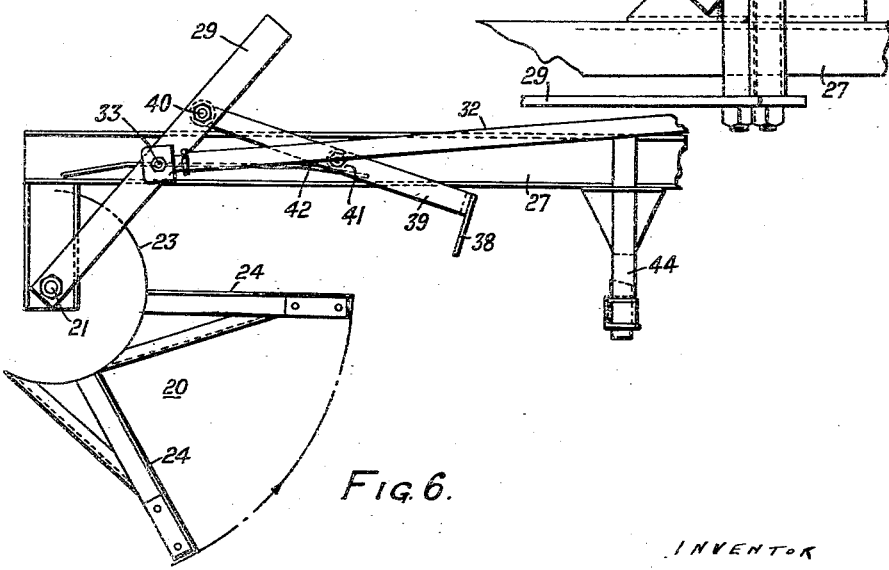
Figure 7:
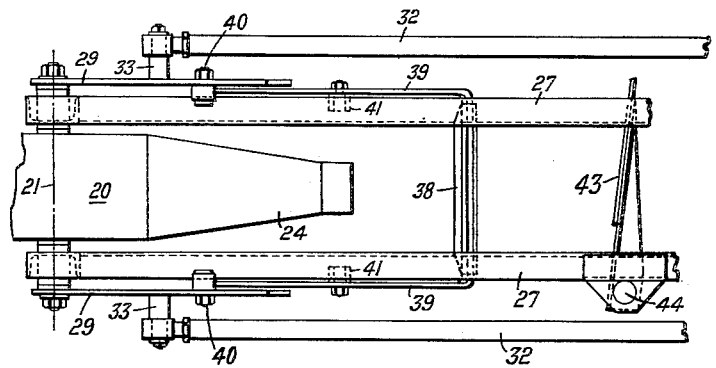
Figure 8:
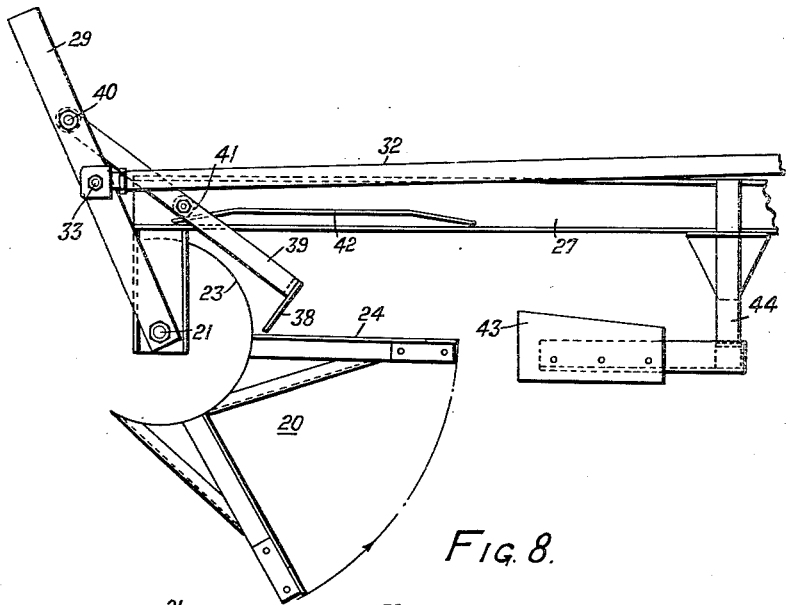
Figure 9:
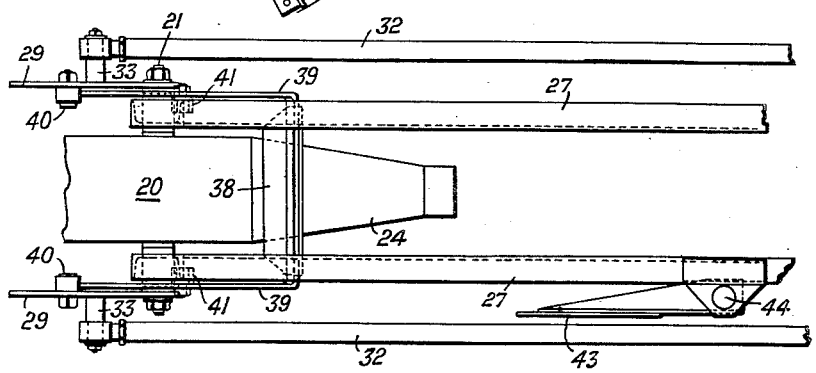

A trench-forming excavator according to the invention is illustrated in the accompanying drawings in which Fig. 1 is a side elevation; Fig. 2 is a plan view of Fig. 1; Fig. 3 is a transverse vertical section on the line a—s of Fig. 1; Figs. 4 and 5 are a side elevation and a plan view, respectively, drawn to a larger scale, of the rotor-actuating pawl-lever; Figs. 6–11 are fragmentary views illustrating progressive stages in the operation of the scraper member and the wiper member, Figs. 6, 8 and 10 being side elevations and Figs. 7, 9 and 11 being plan views of Figs. 6, 8 and 10, respectively.

Referring to the drawings, the trench excavator shown comprises a vehicle structure at the rearward end of which, considered in the direction of travel of the excavator in forming a trench, is a stepwise rotatable bladed paddle-like rotor 20 mounted for rotation about a substantially horizontal axis 21 transverse to the direction of travel of the excavator and adapted to be advanced bodily horizontally by stepwise feeding movements alternating with the stepwise rotary movements of the rotor.

The direction of rotation of the rotor 20 is such that, in each rotative step of the rotor, an arcuate strip of soil is gouged or milled forwardly and upwardly from the forward end of the trench indicated at 22 (Figs. 1 and 3).

Means operating in timed relationship with the rotor 20 is provided for discharging the excavated soil from the rotor and for displacing the excavated soil laterally of the line of travel of the excavator.

The rotor 20 comprises an axially spaced pair of side flanges 23 and a plurality of plane radial blades 24 e. g., six, radiating considerably beyond the side flanges.

For the purpose of starting the excavation of a trench, the rotor 20 is allowed to rotate without forward traverse until the rotor has dug itself down into the soil to the requisite depth, which latter preferably does not exceed half of the diameter of the rotor. When the rotor has attained the requisite depth, forward feed is initiated and excavation progresses at a rate which is variable and which is dependent on the speed of rotation and of feed of the rotor.

As shown, the rotor is adapted to be driven from the power take-off shaft 25 of an agricultural tractor 26.

The rotor is mounted on the rear end of a frame 27 pivotally supported at its forward end on a crankshaft 28 hereinafter referred to and mounted on the rear of the tractor chassis, so that the frame 27 may be luffed crane jib fashion and the depth of trench thus controlled as desired. When the excavator is not in use, or to facilitate transport, the excavator attachment may simply be raised about its pivotal connection with the tractor to a level well above ground level.

Driving means for the rotor 20 comprises a twin lever structure 29 arranged to oscillate about and above an axis coincident with the axis of the rotor and carrying a pawl 30 which is engageable with the tips of the blades 24 whereby to impart stepwise rotation to the rotor, each feeding step of the pawl 30 being rather greater than the angular pitch between two adjacent blades of the rotor. Motion is transmitted to the oscillatory pawl lever structure 29 from twin cranks 31 of the crank shaft 28 which is driven from the power take-off shaft 25. The cranks 31 are respectively connected by means of a pair of connecting rods 32 operating in parallel to the pawl-lever 29 at points 33 intermediate the length of the pawl-lever.

The means for feeding the tractor and therewith the excavator forwardly may comprise a step-wise-operated winch 34 mounted on the rear of the tractor and driven from a cam 35 on the crankshaft 28 through the medium of readily variable ratchet gearing 36. A haulage rope or wire 37 is led from the winch 34, forwardly below the tractor to an anchorage in advance of the tractor.

Figure 10:
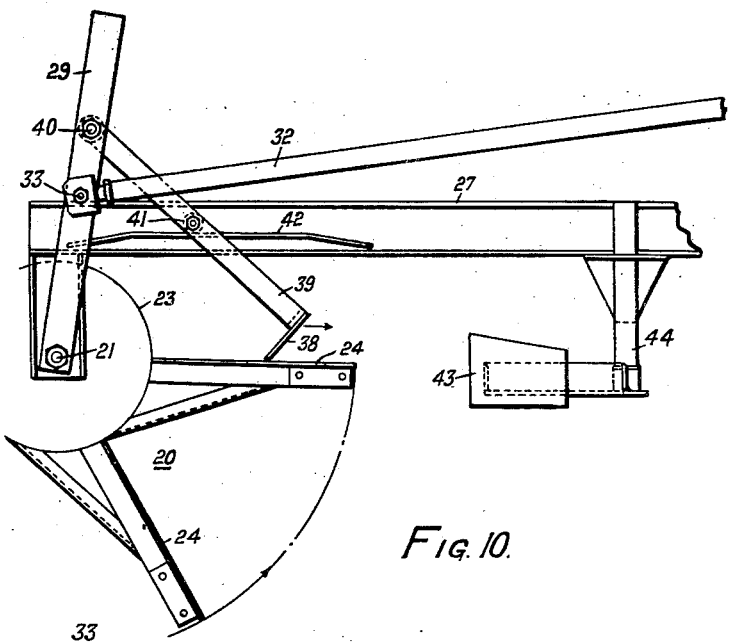
Figure 11:
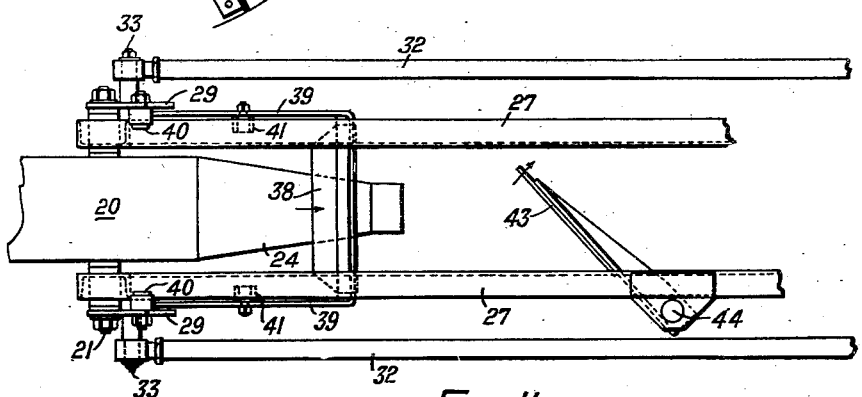

For discharging the excavated soil from the rotor 20 there is provided a primary scraper member 38 which reciprocates in the line of travel of the excavator in advance of the rotor. The scraper member 38 is adapted to enter the leading above-ground inter-blade space of the rotor 20 and to push from the emergent or upcoming blade 24 of the rotor the soil which is adhering to the leading face of said blade. The scraper member 38 is attached to the forward ends of a pair of arms 39 of which the rear ends are pivotally connected at 40 to the pawl-lever 29 at points above the pivotal connections 33 of the connecting rods 32 with the pawl-lever 29. The arms 39 are provided with roller followers 41 adapted to track cams 42 attached to the frame 27. Thus, in operation, the scraper member 38 dislodges the soil from the emergent rotor blade while the scraper member is advancing along said blade, as shown in Fig. 10, the scraper member subsequently re-entering the swept volume of the rotor for a subsequent forward stroke. As will be understood, the scraper member 38 pushes the excavated soil from the rotor on to the ground immediately in advance of the leading end of the trench. The width of the scraper member 38 is preferably considerably in excess of the width of the mouth of the trench. The soil so deposited by the scraper member 38 is displaced to one side of the path of the excavator by means of an oscillatory secondary scraper member 43 mounted to oscillate about an upright axis 44 in advance of primary scraper member, and in timed relation with the primary scraper member. The secondary scraper 43 derives actuation from the pawl-lever 29 through the medium of links 45 and 46, a lever 47, and a crank 48. The conjoint operation of the scraper members 38 and 43 is illustrated in Figs. 6-11, the several views being self-explanatory.

Associated with the rotor 20 are spring detent means 49 adapted to prevent retrograde movement of the rotor during the return strokes of the rotor-driving pawl-lever 29.

The excavator is adapted to be raised and lowered by operation of a handle 50 mounted on the tractor.

It will be understood that, although the excavator is described herein as an attachment for a tractor, the excavator may be incorporated in or adapted for attachment to any kind of land vehicle.

What is claimed is:

1. A trench excavator including a vehicular frame structure, a radially bladed excavating rotor implement mounted on said frame structure for rotation about a horizontal axis transverse to the line of travel of the excavator, means associated with said implement for imparting stepwise rotary movements to said implement, reciprocatory primary scraper means mounted on said frame structure and adapted to enter the swept volume of said implement so as to displace excavated material from said implement to a position in advance of said implement, secondary scraper means mounted on said frame structure in advance of said primary scraper means for displacing the material deposited in advance of said implement to a position on the ground alongside the excavator, and means operative in timed relation with the stepwise rotational movement of said implement for actuating said primary and said secondary scraper means.

2. A trench excavator as claimed in claim 1 in which the means for imparting stepwise rotary movement to the rotor implement includes an oscillatory pawl lever pivoted on an axis coincident with the axis of rotation of the rotor implement, the pawl of said lever co-operating with the blades of said rotor implement in imparting stepwise rotation to said rotor implement, and means for rocking said lever.

3. A trench excavator as claimed in claim 1 in which the means for imparting stepwise rotary movement to the rotor implement and the means for actuating said primary and secondary scraper means include a rock lever pivoted on an axis coincident with the axis of rotation of the rotor implement, means for imparting rocking movements to said lever, a pawl on said lever co-operative with the blades of said rotor implement, arms pivoted to said lever and carrying the primary scraper means, and link and lever connections between said lever and the secondary scraper means.

WALLACE MITCHELL HENDERSON.